United States Patent [19]

Fonseca

[11] 4,359,065
[45] Nov. 16, 1982

[54] VALVE

[76] Inventor: Eduardo J. A. Fonseca, Residencias Veracruz - Apto. 1B, Urb. Las Mercedes, Avda. Veracruz

[21] Appl. No.: 26,651

[22] Filed: Apr. 3, 1979

[51] Int. Cl.³ ............................................. F16K 31/34
[52] U.S. Cl. .................................. 137/413; 137/430; 137/448; 137/434; 137/443
[58] Field of Search ............... 137/413, 414, 429, 430, 137/445, 448, 443, 434; 251/44, 45, 46

[56] References Cited

U.S. PATENT DOCUMENTS

| 548,977 | 10/1895 | Foster | 137/413 |
|---|---|---|---|
| 551,577 | 12/1895 | Chamberlain | 137/413 |
| 557,975 | 4/1896 | Coony | 137/413 |
| 1,302,538 | 5/1919 | Gulick | 137/413 |
| 1,758,068 | 5/1930 | Winfield | 137/429 |
| 2,491,521 | 12/1949 | Samiran | 251/46 |
| 2,781,772 | 2/1957 | Russell | 137/414 |
| 2,855,949 | 10/1958 | Sterner et al. | 137/414 |
| 3,856,035 | 12/1974 | Fujiwara | 137/413 |

FOREIGN PATENT DOCUMENTS 2627775 12/1977 Fed. Rep. of Germany ...... 137/448

Primary Examiner—George L. Walton
Attorney, Agent, or Firm—Phillips, Moore, Lempio & Majestic

[57] ABSTRACT

A valve, of compact design, permits the opening and blocking of a liquid flow whose level is directly proportional to the operation of the valve, with the use of conventional floats being completely abandoned, and with the hydraulic mechanism of said valve being activated in different manners, according to the origin of the source of flow, which can be produced either through the upper part of the tank or from the bottom. There are three embodiments of the valve.

9 Claims, 6 Drawing Figures

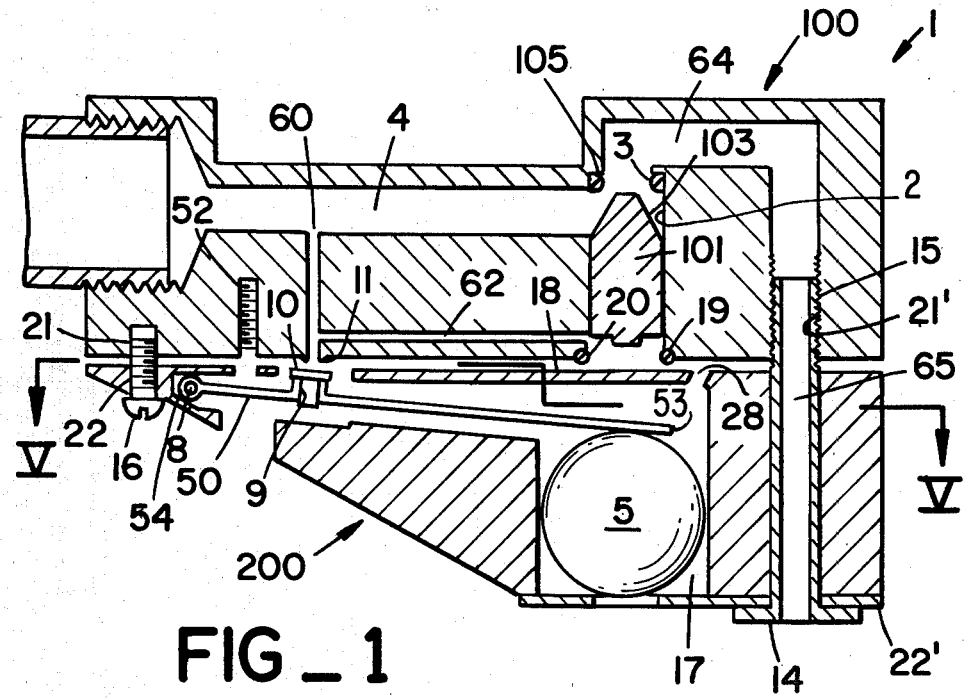
FIG_1
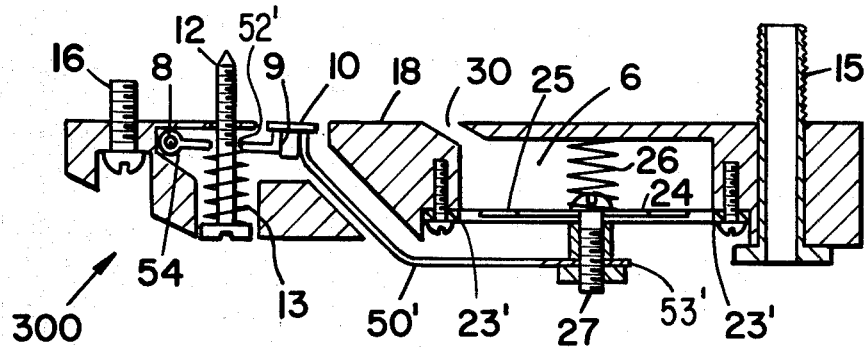
FIG_2
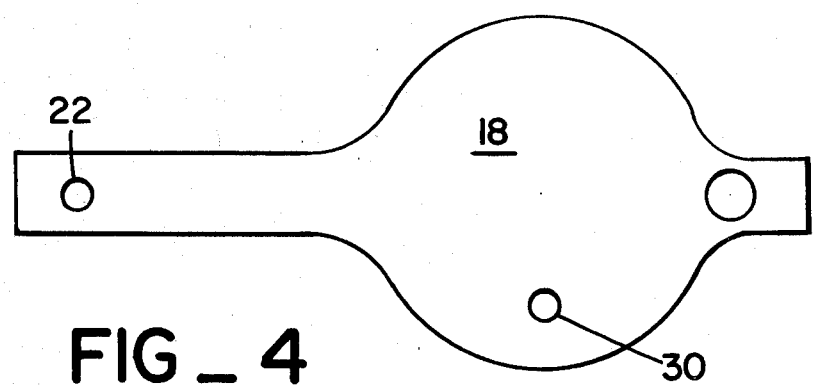
FIG_4

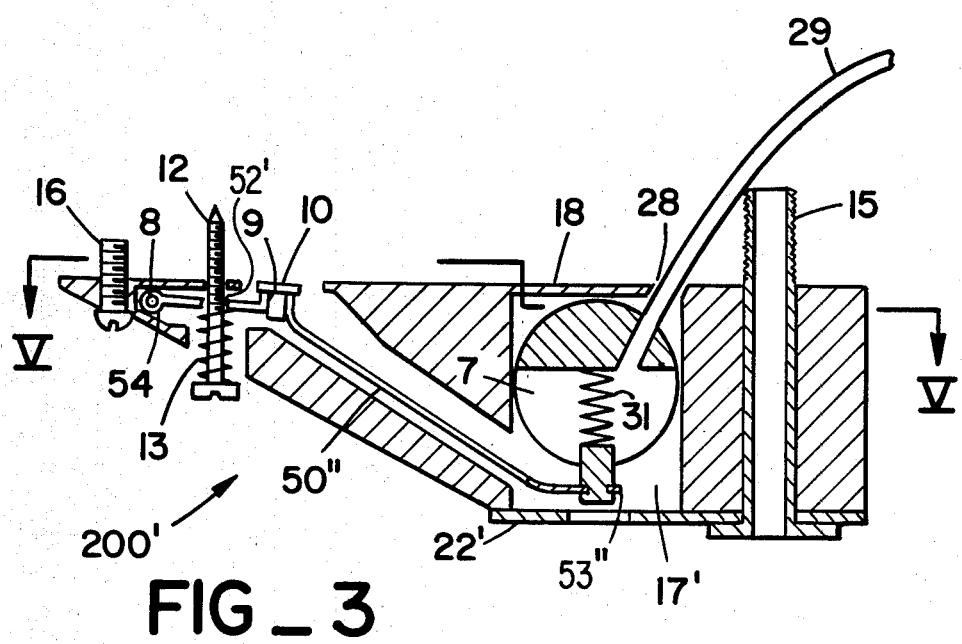
FIG_3
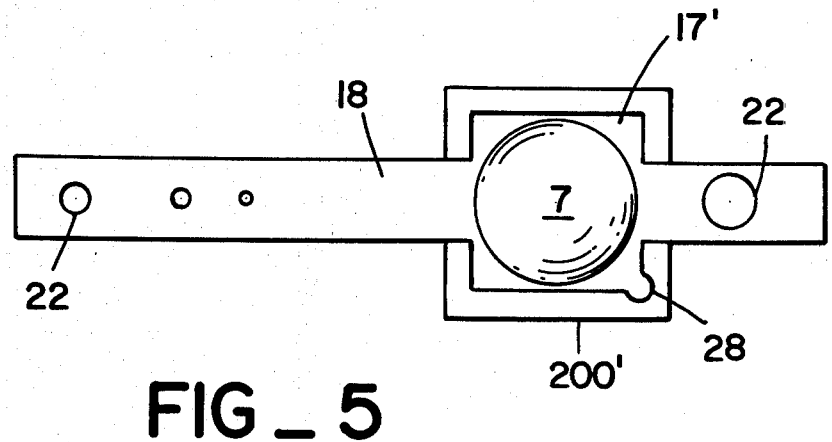
FIG_5
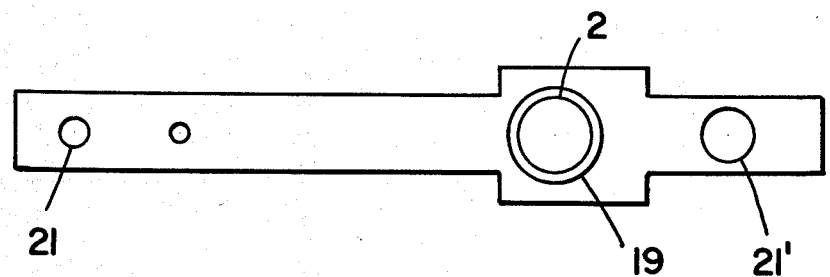
FIG_6

VALVE

DESCRIPTION

Background of the Invention

This invention relates to valves. In particular it relates to valves used for establishing and maintaining a level of fluid in a tank when the source of the fluid is under pressure.

Valves of this type usually involve a float which operates a cock mounted on a lever arm. Although such valves are satisfactory, a leak in the cock can result in substantial water loss. This is a result of a continuous passage of water passing the cock. Accordingly if the main valve can be removed from the cock and operated hydraulically, leakage by the cock although not preventing water loss, can be reduced to a minimum by restricting the size of the cock. Furthermore by such an arrangement, the main flow can be much larger thus resulting in a more rapid tank fill.

SUMMARY OF THE INVENTION

This invention solves one or more of the problems set forth above.

The invention is a valve having an upper housing adapted for communication with a source of pressurized fluid. The upper housing defines a vertically oriented chamber, a first passage for communicating pressurized fluid to the vertically oriented chamber, a second passage for communicating fluid from the upper end of the vertically oriented chamber and a third passage communicating fluid to the lower end of the vertically oriented chamber. A float or piston having a specific gravity less than the pressurized fluid is slidably mounted in the vertically oriented chamber. Provision is included for venting the third passage.

The aforedescribed valve operates in a manner such that the float is hydraulically influenced to open and close the second passage upon venting or blocking of the third passage.

BRIEF DESCRIPTION OF THE DRAWINGS

FIG. 1 is an exploded view partly in section of the valve which is described herein.

FIG. 2 is the lower portion of an alternate embodiment of the valve described herein.

FIG. 3 is the lower portion of another alternate embodiment of the valve described herein.

FIG. 4 is a top view of the embodiment shown in FIG. 2.

FIG. 5 is a view partly in section of the embodiments shown in FIG. 1 and FIG. 3 with the spherical member removed and shown above line V—V.

FIG. 6 is a bottom view of the upper housing as used in all embodiments.

DETAILED DESCRIPTION OF THE PREFERRED EMBODIMENT

In either of the embodiments described, the Valve 1 consists of two parts: (1) a main core 100, which appears in FIGS. 1 and 6, which constitutes the aforementioned valve proper, and (2) a lower housing or core 200 shown in FIGS. 1, 3 and 5 or 300 as shown in FIGS. 2 and 4.

FIG. 1 shows the lifting device, which consists solely of a lever 50 which is mechanically activated and arranged according to the following description and appended figures, and a small plastic sphere 5, whose diameter is directly proportional to the pressure that one wishes to seal off. The sphere has a specific gravity which is less than the specific gravity of the fluid.

In FIG. 2 it is seen that the device which activates the hydraulic mechanism of the main core 100 consists of a diaphragm 6 or 7 which actuates the same end of the lever 50' as the plastic sphere 5 in the device shown in FIG. 1. The diaphragm, in turn, can be a conventional plane diaphragm 6 or a spherical diaphragm 7 made of a flexible material, preferably rubber (see FIG. 3). The latter constitutes an innovation for sealing off a source of pressurized fluid (not shown) provided to the left end of passage 4 of main core 100 (in tanks and reservoirs) with an average of 40 centimeters of head (as measured from the bottom to the line of flotation) as is the case with sanitary tanks in which the column of liquid is approximately 26 centimeters high; depths exceeding 40 centimeters will require the use of a plane diaphragm 6, which is appropriate for high pressures because of the more resistant materials that are employed, the smaller flexibility of said materials, and the solid mechanization that is utilized.

Furthermore, additional accessories of the lever 50' are a spring 13 and a screw 12 which may be threaded into hole 52 of main core 100, and which enables the regulation of pressure and consequently the establishment of the height at which it is desired to seal off or reestablish the liquid flow.

The reason for having two distinct sealing devices (sphere or diaphragm) is that the first device (the sphere) may operate above the line of flotation, while the second is for use below the line of flotation, at any depth in the tank or reservoir (for example down to one centimeter in depth), by means of a pressure-regulating device to be described, and for which the force is also directly proportional to the estimated height.

The duality in the use of the valve 1, at any depth and with different sources of pressurized fluid, is obtained by means of the aforementioned devices (either as shown in FIGS. 1, 2 or 3), which the user can acquire according to his needs, since all have an identical base for connection to the main core 100.

FIGS. 1 and 2 show the main core 100 which is the same for all embodiments. It is seen that the blocking piston 101, having a specific gravity which is less than the specific gravity of the pressurized fluid, remains in its lower position inside vertically oriented chamber or cylindrical cavity formed in the main core 100 which constitutes an upper housing, thus maintaining a distance between its upper conical part 103 and the ring-shaped seal 3 of the valve seat 105, above which the sealing off or opening of the flow of pressurized fluid that passes through a passage 4 is performed. Also, the blocking lever 50 (50' or 50"), as is seen, remains inactive, resting its end 53 on the plastic sphere 5, which in the case of the alternate embodiments is replaced by a plane diaphragm 6 or a spherical diaphragm 7.

In either case the end 54 of the lever is fastened to the core 200, 200' or 300 by means of a pin 8, about which the lever rotates in a horizontal plane. A short distance from pin 8 on the same lever 50 (50' or 50") there is a hole 9 for the fastening of a rubber stopper 10, which causes the hydraulic mechanism of main core 100 to function by being compressed against the valve seat 11 of main core 100, either by the action of the plastic sphere 5 or of either of the diaphragms 6 or 7 acting on lever 50, 50' or 50". Between the pin 8 and the hole 9 there is another hole 52' for an adjustment screw 12, which screws into main core 100 compressing a spring 13, which in turn adjusts the pressure of the lever 50' or 50" by pin 8 as a fulcrum.

In the same manner, passages 60 and 62 can be seen (in addition to the valve seat 11) in main core 100 which together cause the hydraulic mechanism to function due to the ratio between their diameters; in order to obtain a greater (or lesser) rate of flow, the ratio between the diameters of the aforementioned channels or conduits would be especially formulated for each case.

From the point of view of opening or blocking (at the height of the ring-shaped seal 3) the pressurized fluid that flows in via passage 4 (if the piston 101 is in a lowered position) continues its course up to the outlet 14 following channels 64 and 65, this latter channel being formed by the hollow interior of the front coupling screw 15 which, with the coupling screw 16 located at the rear end, fastens either of the lower housings or cores 200, 200' or 300 to the main core 100.

The lower housing or core 200, as is seen in FIG. 1, has a cylindrical cavity 17, inside of which the plastic sphere 5 moves, of which serves to seat the spherical diaphragm 7. Both the plastic sphere 5 and the spherical diaphragm 7 have the same diameter.

Fixing either lower core 200 or 200' to main core 100 provides a watertight seal of cylindrical cavity 2 when coupled with main core 100. This is possible because all of the upper surface 18 of any of the lower housings or cores is flat, thus compressing the annular seal 20 that goes in the circular and concentric seat 19 of the aforementioned main core 100.

In one of the front corners of the lower core 200' there is an opening 28 through which a flexible conduit 29 passes, which enables the evacuation of spherical diaphragm 7. In the case of the plane diaphragm 6, the connection for evacuation is located at position 30. On both ends of the lower housings or cores 200, 200' or 300, as well as in the ends of main core 100, threaded openings 21, 21' and 22 exist for fastening screws; there is a cover 22' (for closing off and protecting the plastic sphere 5 and spherical diaphragm 7) which is fastened to the lower core with the same front coupling screw 15.

The core 300 (see FIG. 2) differs from the cores described above only in that the area that is occupied by the plane diaphragm 6 (whose circular seat relies upon six threaded openings which coincide with an equal number of threaded perforations in a diaphragm fastening ring 23) is decreased. The plane diaphragm proper 24 is made of an impermeable membrane which is appropriate for this use, and relies upon a circular reinforcement 25 which is made of a rigid material, and which is slightly smaller in diameter, by which the pressure of the actuating liquid is brought fully to bear. In the cavity that is closed off by this diaphragm there is a spring 26 which balances the pressure that the lever 50' exerts on the other spring 13 (described above). There is also a screw 27 which fastens the diaphragm, circular reinforcement 25 and end 53' of the lever 50, and which serves as an internal guide for the spring 26.

The spherical diaphragm 7, as is seen in FIG. 3, is compressed vertically inside the aforementioned cylindrical cavity 17 in the core 200' by the pressure of the column of actuating liquid (water, etc.) and the force of the spring 13 which is located (as has already been mentioned) on the end 54 of the lever. Here the balancing of pressure is obtained by the corresponding compression in the rubber sphere and the additional force that is produced by a spring 31 which is located in the interior of said rubber sphere.

If the source of fluid is provided through the upper part of the tank or reservoir, the opening or blocking of the flow of the fluid is obtained as a function of the level of the flotation line. Otherwise, the operation of the valve is conditioned by a plane or spherical diaphragm, either of which acts in accordance with the pressure exerted on it by the column of liquid that covers it.

In either of the two cases the hydraulic mechanism operates in the same manner, with only the driving devices (i.e., the plastic sphere or the plane or "spherical" diaphragms) varying as follows: having established a flow of liquid in order to fill a tank or reservoir from its upper part, the valve remains inactive until the moment at which the level of the liquid elevates the plastic sphere 5, which in turn causes the vertical displacement of the end 53 of the lever. Because of said movement, the lever 50, supported at its rear end 54 by the pin 8, strikes its contact point over the orifice 11 blocking in turn the outlet of the supplied liquid, and in this manner attaining the pressure below the piston 101 (via the channel 60 in the main core 100) so that at that instant the conical upper end 103 of the aforementioned piston 1 makes contact with the ring-shaped seal 3, closing off the flow of liquid toward the final outlet of the valve 14. Conversely, when the pressure of the water or other liquid on the plastic sphere 5 is removed, the end 53 of the lever falls, causing the orifice 11 to open, which produces an imbalance in the pressure on the piston, which therefore drops due to the action of gravity, permitting the flow of liquid to be reestablished in this manner. The described operation will be identical when the pressure on the end 53 of the lever 50 is originated by the action of the device with a plane or spherical diaphragm.

What is claimed is:

1. In combination with an atmospherically vented tank, a valve comprising:

an upper housing adapted for communication with a source of pressurized fluid, said housing defining a vertically-oriented chamber, first passage means for communicating said pressurized fluid to said vertically-oriented chamber, second passage means for communicating fluid from the upper end of said vertically-oriented chamber, and third relatively restricted passage means for bypassing said first passage means and for communicating said pressurized fluid to the bottom end of said vertically-oriented chamber, said third passage means being formed integrally in the housing;

a piston having a specific gravity less than the specific gravity of the pressurized fluid, said piston being slidably positioned in said vertically-oriented chamber, said piston further defining at its upper end a first surface and further wherein the vertically-oriented chamber defines a valve seat at its upper end, said first surface being adapted for seating engagement with said valve seat to shut off flow between the first passage and the second passage;

a lower housing releasably coupled to said upper housing, said upper housing further defining a fourth passage means for communicating said third passage means with said lower housing;

said second passage means including threaded coupling means for fixing said lower housing to said upper housing and for communicating fluid from said second passage means through said lower housing to said atmospherically-vented tank;

a lever arm having a first end and a second end, said lever arm being mounted in said lower housing for rotational movement about said first end;

a valve plug affixed to said lever arm and adapted to close said fourth passage means and to vent said fourth passage means in response to rotational movement of the lever arm; and activating means for rotatably moving the lever arm in response to the level of the fluid in the tank, said piston adapted to shut off the flow between the first passage means and the second passage means.

2. The valve of claim 1 wherein the piston defines at its upper end a first surface and further wherein the vertically oriented chamber defines a valve seat at its upper end, said first surface being adapted for seating engagement with said valve seat.

3. The valve of claim 1 wherein the activating means comprises:

a spherical float vertically movable within said lower housing and having a specific gravity less than the fluid, said spherical float influencable by said fluid to register with said second end of said lever arm to open and close said fourth passage.

4. The valve of claim 3 wherein the spherical float is of a preselected diameter, said diameter being directly proportional to the pressure of the fluid in the first passage means.

5. The valve of claim 1 wherein the activating means comprises:

an elastomeric diaphragm connected to said second end of said lever arm, said diaphragm being disposed in said lower housing for displacement in the vertical direction in response to the pressure of the fluid in the tank to open and close said fourth passage means.

6. The valve of claim 5 wherein said diaphragm is planar.

7. The valve of claim 5 wherein said diaphragm is spherical.

8. The valve of claim 5 wherein said activating means further includes spring means for balancing the pressure acting on said lever arm.

9. The valve of claim 5 wherein the valve diaphragm is disposed below the level of fluid in the tank.

* * * * *